July 8, 1947.  F. DUSTAN  2,423,442
DRUM SCREEN
Filed Feb. 28, 1945  2 Sheets-Sheet 2
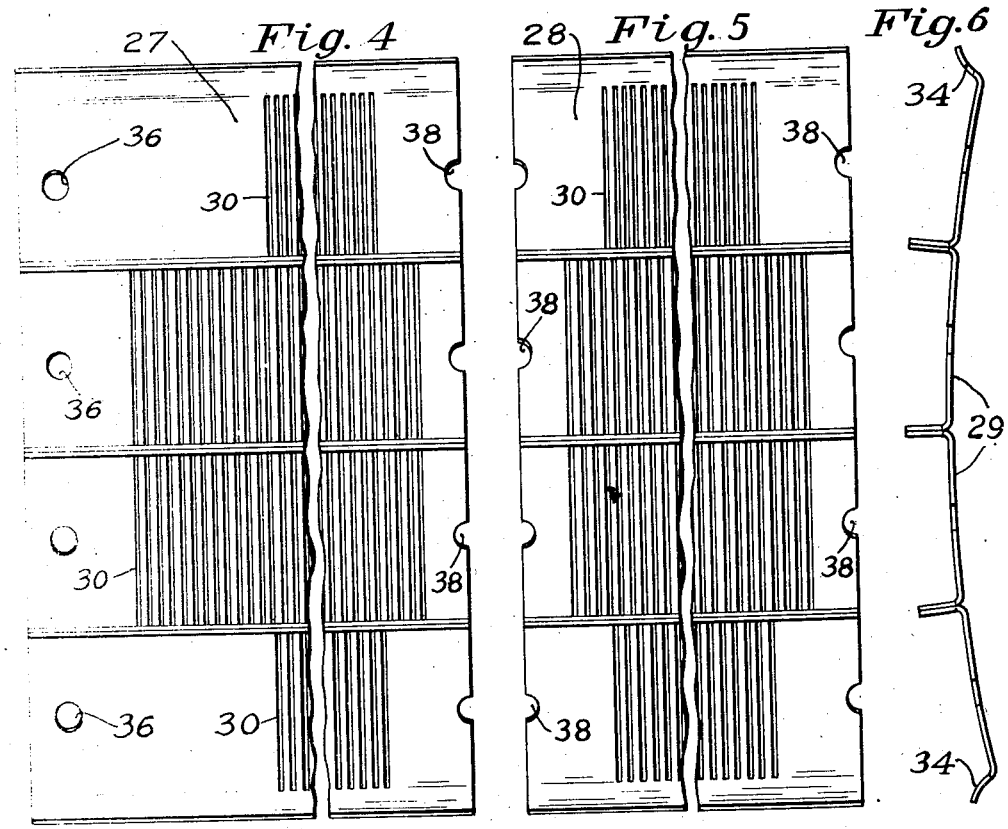
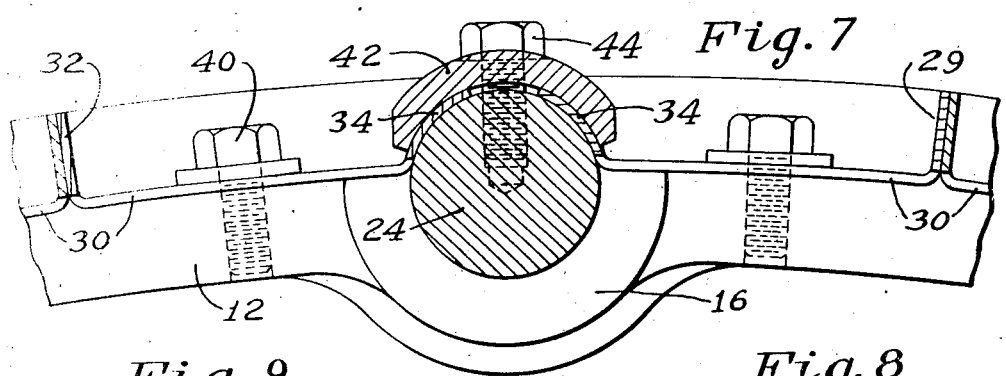
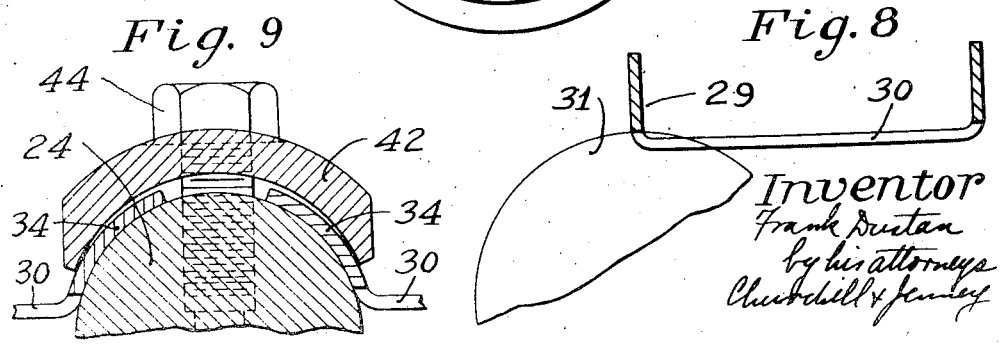
Inventor
Frank Dustan
by his attorneys
Churchill & Jenney Patented July 8, 1947

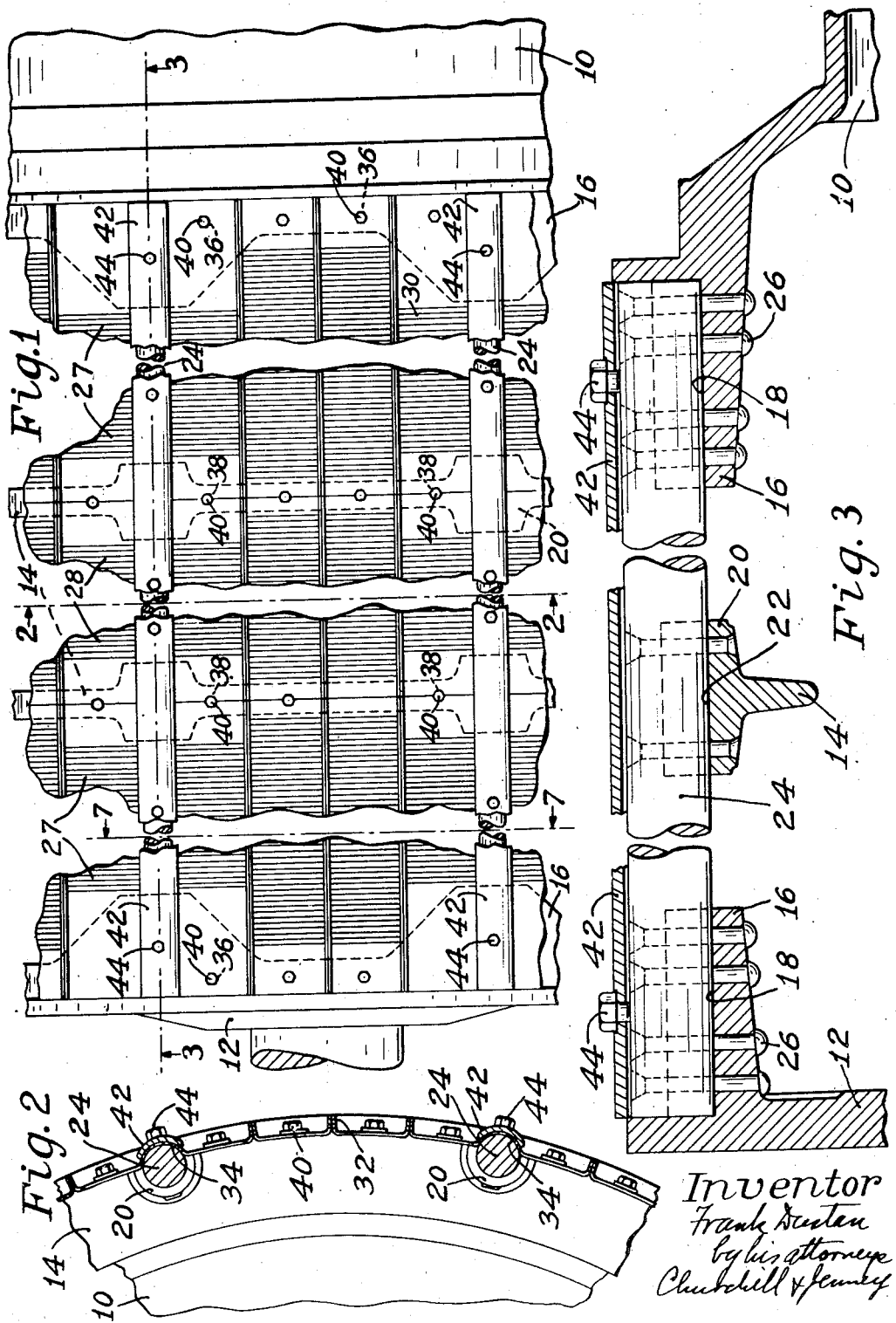

2,423,442

UNITED STATES PATENT OFFICE 2,423,442

DRUM SCREEN

Frank Dustan, Fitchburg, Mass., assignor to National Lead Company, New York, N. Y., a corporation of New Jersey Application February 28, 1945, Serial No. 580,097

3 Claims. (Cl. 92—35)

The present invention relates to drum screens for paper screening operations.

The usual form of drum screen cylinder comprises heavy bronze plates in which suitable slots are milled. The plates conform to the curvature of the screen and are suitably secured to longitudinal half-round bars, which in turn are secured to the heads or end members.

It is the principal object of the present invention to provide a satisfactory drum screen cylinder in which the screening operation is effected by means of thin plates. In flat screening operations, the advantages of thin stainless steel plates have been recognized, as disclosed in my Reissue Patent No. 20,533, dated October 19, 1937, and my Patent No. 2,015,139, dated September 24, 1935. It will be appreciated that the application of thin plates to a drum screen presents a serious problem of strength. In the bronze plate type of screen, the plates themselves contribute substantially to the structural strength of the screen, whereas the thin plates offer no substantial strength, particularly against torsional stresses.

According to the present invention, a drum screen cylinder is constructed using thin stainless steel plate assemblies as the screening members and adequate strength is provided for the assembly by the screen structure, as will hereinafter be described in detail.

In the accompanying drawings, Fig. 1 is an elevation of the screen, Figs. 2 and 3 are sectional elevations of portions of the screen; Figs. 4 and 5 are detail views illustrating the screen plate assemblies; Fig. 6 is an end view of a screen plate assembly; Fig. 7 is an enlarged sectional view showing the assembly of the parts; Fig. 8 is a diagram showing the sawing operation; and Fig. 9 is a detail view of the clamping member.

The screen comprises end members or heads indicated as a discharge head 10 and a drive end cylinder head 12, which are of generally conventional construction except as hereinafter noted. The screen is also provided with intermediate ring members 14, preferably two in number for a screen approximately 100 inches long.

Each head is provided with inwardly extending bosses 16, in which approximately semi-circular recesses 18 are formed. The center rings are also formed with bosses 20 having aligning semi-circular recesses 22 to align with the recesses 18 of the heads. Received in the recesses and extending longitudinally of the drum are a plurality of supporting bars 24 of substantially circular cross section. The bars are suitably secured to the heads and rings, as by rivets indicated at 26.

The screen plate structure is supported by the bars 24, the heads 10 and 12 and the center rings 14. Between each adjacent pair of bars there are mounted three screen plate assemblies, shown generally at 27 and 28 in Fig. 1. Each assembly comprises four adjacent plates 29 of thin stainless steel and having outwardly extending flanges by which the plates are secured together. In manufacture the plates are formed with the flanges as indicated in Fig. 8 and transverse slots 30 are sawn therein, preferably by a gang saw 31 to cut several slots at a time.

It is to be noted that since support for the plates is afforded by the flanges, the slots may extend completely across the screening surface of the plates, as indicated in Fig. 8. For each plate, the sawing operation may therefore be effected by a saw which makes a straight cut across the plate without the necessity for an entering and withdrawing operation. The screening surface is thus increased considerably over that of the bronze plate, wherein a substantial distance must be left between adjacent slots.

After sawing the slots, the plates are then curved, as shown in Fig. 6, to conform to the curvature of the drum, and the four plates forming the complete assembly are secured together by spot-welding adjacent flanges. Thus the flanges 32 of the two inner plates extend radially outward so that the plates can be secured by the welding operation. The outer flanges 34 of the two outside plates are shaped to fit closely about the circular bars 24.

As shown in Fig. 1, three complete assemblies are mounted between each two adjacent bars. The end assemblies 27 are provided with bolt holes 36 near one end for attachment to the heads and with half-holes 38 near the other end for attachment to the rings 14. The middle assembly 28, which is secured to the rings, is formed with half-holes at each end.

In making the structure, the requisite plate assemblies, formed as described above, are fitted into their proper positions with the curved outer flanges 34 conforming to the surfaces of the bars 24. The three plate assemblies that constitute a section abut in longitudinal relation so that the several assemblies may be secured by the bolts 40 passing through the holes 36 and 38 into suitably tapped openings in the heads and rings.

It will be noted that the assemblies of each section abut in such a manner that the half-holes are in register whereby a single bolt secures two abutting plates to the intermediate ring.

Longitudinal clamping members 42 are used to secure the plate assemblies to the bars. As shown in Fig. 9; each clamping member conforms approximately to the curvature of the outside surface of the curved flanges 34, except that it is on a slightly shorter radius in order that the clamping member may pinch the flanges at the outside and be drawn into firm engagement therewith upon application of pressure by the bolts 44, which are threaded into the bars.

The cylinder is mounted in the vat in the usual manner. The cylinder is driven and the vat is vibrated by conventional means, not herein shown.

It will be observed that the structure is of simple and easily manufactured construction, is of adequate strength and affords maximum screening action for a given surface. The problem of strength is important, particularly in torsion, since the cylinder is driven through only one of the heads, the discharge head being necessarily provided with a large unobstructed opening to which no drive shaft attachment can be made. The bars 24, being of circular section, afford maximum torsional resistance for their size and thus prevent weaving or warping of the thin plates under the stresses encountered in operation.

As heretofore noted, the plates contribute nearly their full area for screening, the only loss of area being occasioned by the thickness of the flanges. This is distinguished from the thick-plate construction, wherein a considerable part of the surface must be left unslotted.

For replacements of damaged plates, a screen assembly may be easily removed and a new preformed assembly substituted.

Having thus described my invention, I claim:

1. A drum screen cylinder for paper screening comprising end heads, intermediate ring members, a series of bars of substantially circular cross-section connecting the heads and ring members, a plurality of thin screen plate assemblies conforming to the curvature of the drum and having edge flanges shaped to conform to the outer surfaces of the bars, longitudinal clamping pieces fitting over the shaped flanges of the screens, and means for securing the clamping pieces to the bars.

2. A drum screen cylinder for paper screening comprising end heads, intermediate ring members, a series of bars of substantially circular cross-section connecting the heads and ring members, a plurality of thin screen plate assemblies conforming to the curvature of the drum, each assembly comprising a plurality of thin plates with longitudinal outwardly extending and abutting flanges, each plate having circumferentially extending slots, the outer edge flanges of each assembly being shaped to conform to the outer surfaces of the bars, longitudinal clamping pieces fitting over the shaped flanges of the screens, and means for securing the clamping pieces to the bars.

3. A drum screen cylinder for paper screening comprising end heads, intermediate ring members, a series of bars of substantially circular cross-section connecting the heads and ring members, a plurality of thin screen plate assemblies conforming to the curvature of the drum, each assembly comprising a plurality of thin plates with longitudinal outwardly extending flanges, the flanges of adjacent plates being in abutting relationship, means for securing several of said assemblies in longitudinal relationship to the heads and rings, the outer edge flanges of each assembly being shaped to conform to the outer surfaces of the bars, longitudinal clamping pieces fitting over the shaped flanges of the screens, and means for securing the clamping pieces to the bars.

FRANK DUSTAN.

REFERENCES CITED

The following references are of record in the file of this patent:

UNITED STATES PATENTS

| Number | Name | Date |
|---|---|---|
| 2,015,139 | Dustan | Sept. 24, 1935 |
| 1,327,126 | Wandel | Jan. 6, 1920 |
| 1,160,649 | Pope | Nov. 16, 1915 |

FOREIGN PATENTS

| Number | Country | Date |
|---|---|---|
| 16,426 | Great Britain | 1895 |
| 609,741 | Germany | Feb. 22, 1935 |